Feb. 24, 1948. R. C. SANDERS, JR 2,436,672
FREQUENCY MODULATED RADIO DISTANCE MEASURING SYSTEM AND INDICATOR
Filed July 26, 1943 3 Sheets-Sheet 1
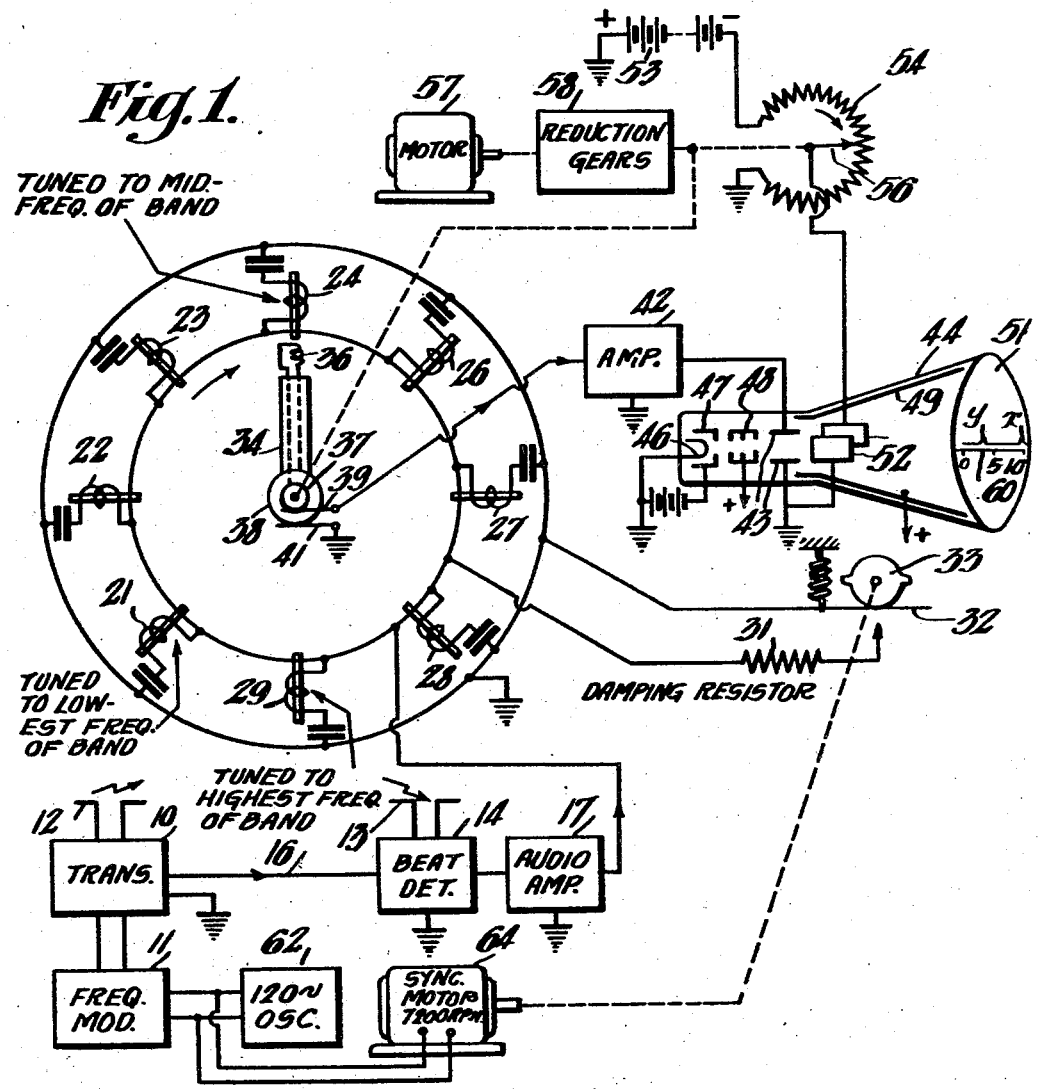
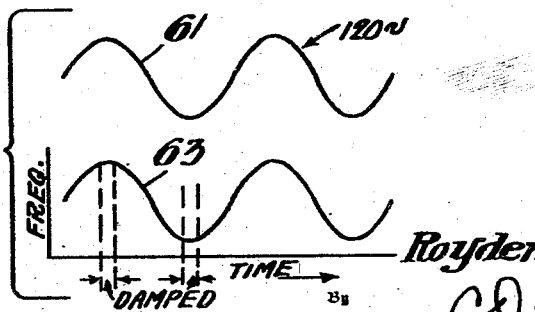
Inventor
Royden C. Sanders, Jr.
Attorney

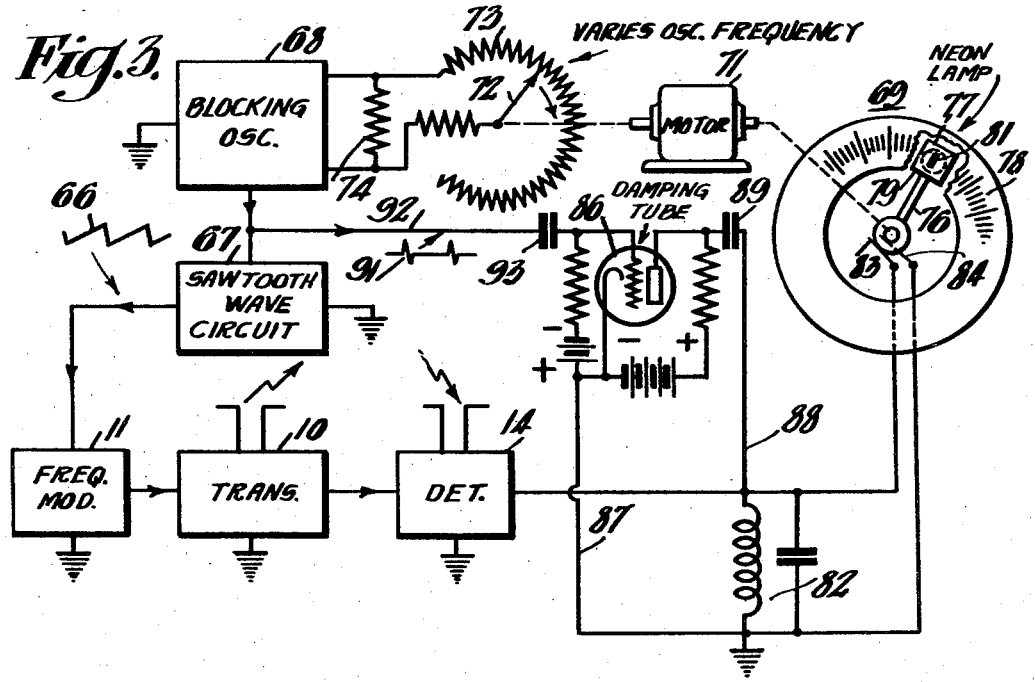
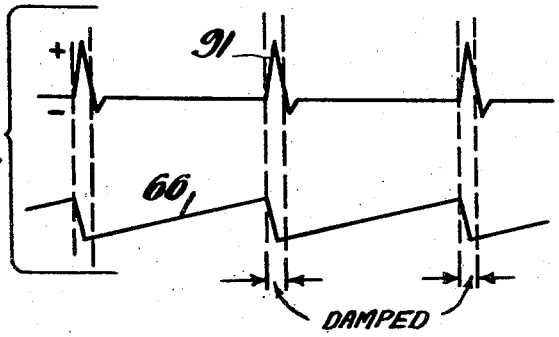

Feb. 24, 1948.  R. C. SANDERS, JR  2,436,672
FREQUENCY MODULATED RADIO DISTANCE MEASURING SYSTEM AND INDICATOR
Filed July 26, 1943  3 Sheets-Sheet 3
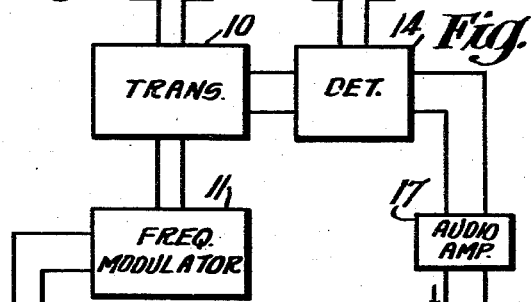
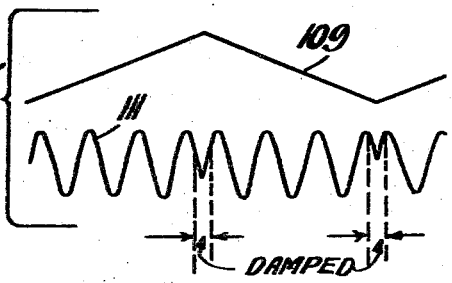
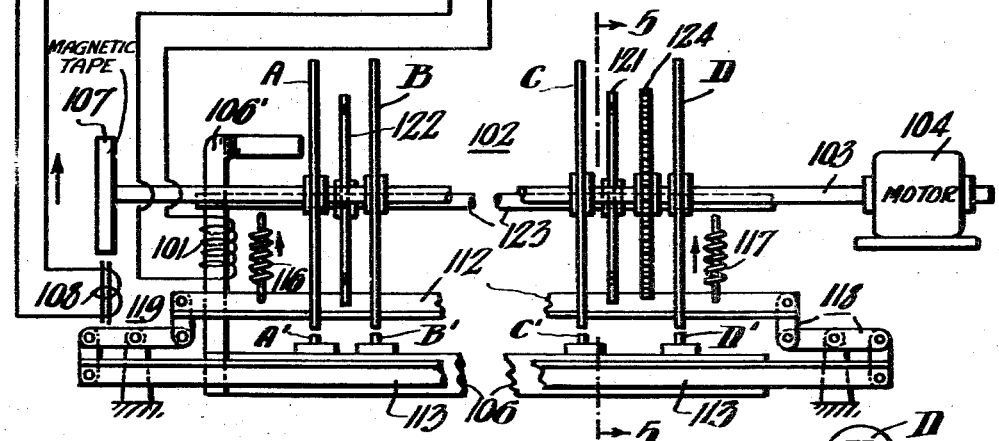
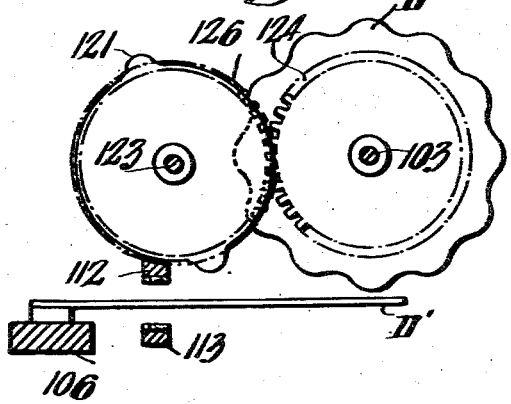
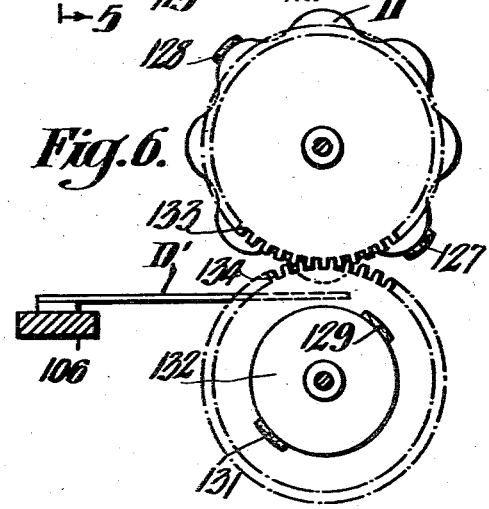
Inventor
*Royden C. Sanders, Jr*
By
Attorney Patented Feb. 24, 1948

2,436,672

UNITED STATES PATENT OFFICE 2,436,672

FREQUENCY MODULATED RADIO DISTANCE MEASURING SYSTEM AND INDICATOR

Royden C. Sanders, Jr., Hightstown, N. J., assignor to Radio Corporation of America, a corporation of Delaware Application July 26, 1943, Serial No. 496,247

7 Claims. (Cl. 343—14)

My invention relates to object locating and distance measuring systems of the type utilizing the transmission and reflection of radio waves or of other suitable waves. The invention relates particularly to multiple frequency indicators and to their use in an object locating system of the frequency-modulated type whereby simultaneous indications of a plurality of reflecting objects may be obtained.

Distance measuring systems of the frequency-modulated type are described in Bentley Patent 2,011,392 and in Espenschied Patent 2,045,071. In these systems, the radiated frequency-modulated wave is reflected from the earth's surface or from an aircraft or other object to be located and the reflected wave is received in a heterodyne receiver located in the vicinity of the transmitter. The heterodyning or mixing signal for the receiver is obtained directly from the transmitter whereby the receiver output includes a signal of "beat frequency" which frequency is a function of the time required for the radiated signal to reach the reflecting object and return to the receiver.

The above-mentioned patents describe systems that employ a frequency counter or the like for obtaining the beat-frequency indication, this also being an indication of the distance to the reflecting object. Such an indicator is satisfactory when there is only one reflecting object of interest such as the earth's surface. When indications are to be obtained from a plurality of reflecting objects or targets, the use of a different type of frequency indicator is desirable. Suitable multiple target indicators and associated systems are described and claimed in application Serial No. 452,990, filed July 31, 1942, in the name of Irving Wolff and entitled Distance measuring apparatus, which has become Patent No. 2,422,157, dated June 10, 1947, and in my copending application Serial No. 481,041, filed March 29, 1943, and entitled Distance indicator, which has become Patent No. 2,422,134, dated June 10, 1947. Such multiple target indicators include one or more tuned circuits, tuned reeds or the like which oscillate in response to the application of a signal having the frequency to which the circuits or reeds are tuned.

Unless suitable means are provided to improve the operation of such resonant circuit indicators, it will be found that the response of the resonant circuit with variations in the distance of the reflecting target will be rather broad. This is because at the extreme of the frequency swing of the transmitter a definite discontinuity in phase occurs in the beat-frequency signal produced by each target. A resonant circuit has its selective properties because the energy from preceding cycles reinforces the energy being applied at resonance. However, if the applied signal has a definite discontinuity in phase then some of the energy from the preceding cycles must dissipate itself in the resonant circuit and the resonant circuit must build up to a new level. The extreme of this for certain types of indicators is when the phase discontinuity is 180° when all the energy built up previous to this time must dissipate itself and a new resonance built up.

An object of the present invention is to provide an improved object locating and/or distance measuring system for indicating a plurality of reflecting objects.

Another object of the invention is to provide an improved indicator for a frequency-modulated radio locator system.

Still another object of the invention is to provide in a frequency-modulated radio locator an improved indicator which will give accurate and simultaneous indications of a plurality of reflecting objects or targets.

In practicing the present invention, I utilize periodic damping of the tuned circuits (be they electrical, mechanical or acoustic) at the instant the frequency swing of the transmitter reverses its direction in the case of triangular or sine wave modulation, for example, or at the end of each sweep in the case of sawtooth modulation.

By damping the resonant circuit or circuits at each extreme of the transmitter frequency swing, the resolution of the response of the resonant circuit with varying distance of the target is improved several fold. This is because it eliminates the beating of the "build up" and "die down" of the resonant circuits at each phase discontinuity point. Under these circumstances, if the transmitter is swept 4 megacycles the resolution with distance is very nearly the same as if a pulse system with a 4 megacycle or ¼ microsecond pulse were used.

The invention will be better understood from the following description taken in connection with the accompanying drawing in which Figure 1 is a circuit and block diagram of a frequency-modulated radio locator system designed in accordance with one embodiment of the invention, Figure 2 is a pair of graphs that are referred to in explaining the operation of the system of Fig. 1, Figure 3 is a circuit and block diagram of another embodiment of the invention, Figure 3a is a pair of graphs that are referred to in explaining the operation of the circuit of Fig. 3, Figure 4 is a diagram in block and a view in elevation of another embodiment of the invention, Figure 5 is a view taken on the line 5—5 of Fig. 4, Figure 6 is a view in vertical section of another embodiment of the invention, and Figure 7 is a pair of graphs that are referred to in explaining the operation of the systems illustrated in Figs. 4 to 6.

In the several figures, similar parts are indicated by similar reference characters.

Fig. 1 shows the present invention applied to a frequency-modulated radio locator system having an indicator of the type described in my above mentioned application Serial No. 481,041. The system comprises a radio transmitter 10 which is cyclically frequency modulated by a suitable frequency modulator 11. The frequency-modulated wave is radiated from an antenna 12 and is picked up by a receiving antenna 13 after reflection from an object to be located and supplied to a beat detector 14 which preferably is of the balanced type. The frequency-modulated wave is also supplied directly to the detector 14 over a conductor 16 whereby the "difference" or beat frequency appears in the detector output circuit. This part of the system may be the same as that described in my copending application Serial No. 445,720, filed June 4, 1942, which has become Patent No. 2,420,199, dated May 6, 1947. The detector output signal is supplied through an audio amplifier 17 to a multiple resonant frequency indicator which includes a plurality of parallel connected series-resonant circuits 21, 22, 23, 24, 26, 27, 28 and 29. The resonant circuits 21, 22, etc. are tuned to successively higher frequencies within the frequency band of the beat-frequency output of the detector. Preferably a much larger number of resonant circuits are employed in an indicator than illustrated in the drawing.

The resonant circuits 21, 22, etc. are damped periodically by means of a damping resistor 31 which is connected thereacross each time a switch 32 is closed by a motor driven cam 33 as described hereinafter.

A rotatable arm 34 carries a pickup coil 36 which is rotated past the resonant circuits 21 to 29 in succession and in such relation to them that any resonant circuit that is being energized or resonated by a beat-frequency signal will energize the pickup coil 36. Signal from the pickup coil 36 is supplied through two collector rings 37 and 38 and their brushes 39 and 41 to an amplifier 42 which impresses the beat-frequency signal upon the deflecting plates 43 of a cathode ray tube 44.

The cathode ray tube 44 may be of a conventional design comprising a cathode 46, a control grid 47, a first anode 48, a second anode 49 and a fluorescent screen 51 coated on the end of the tube envelope. The tube 44 contains a pair of deflecting plates 52 for deflecting the cathode ray horizontally in synchronism with the rotation of the pickup coil 36. The horizontal deflecting voltage for the plates 52 may be obtained, for example, from a battery 53 which has a potentiometer 54 connected thereacross. A potentiometer arm 56, to which one of the deflecting plates 52 is connected, is rotated in synchronism with the rotation of the pickup coil arm 34, both arms being rotated by a motor 57 through reduction gears 58 at a low speed, such as a speed of one rotation per second.

It will be seen that the successive positions of the cathode ray, as it is swept horizontally across the fluorescent screen 51, correspond to the successive positions of the pickup arm 36 and, therefore, to the resonant frequencies, respectively, of the tuned circuits 21 to 29. Thus, an indication $x$ at the extreme right-hand end of the horizontal sweep, for example, shows that the pickup coil 36 has picked up energy from the resonant circuit 29 which is tuned to the highest of the beat frequencies to be indicated. This means that the output of detector 14 includes the beat frequency to which the circuit 29 is tuned. Since this beat-frequency corresponds to a certain distance from the transmitter to the reflecting object, 10 miles for example, this distance may be marked under the cathode ray indication $x$ on a distance scale 60 adjacent to the horizontal deflection axis. Thus, it is evident that the distance scale 60 may be calibrated for the distance range through which the equipment is designed to function whereby any other cathode ray indication, such as the indication $y$, shows the distance to the reflecting object producing the indication.

Referring more particularly to the method of applying periodic damping to the indicator of Fig. 1, the graph 61 in Fig. 2 represents the 120 cycle current or voltage that is supplied to the frequency modulator 11 from a suitable oscillator or other source 62. The resulting frequency modulation on the transmitted radio wave is illustrated by the graph 63. As indicated by the legend, the damping is applied to the tuned circuits of the indicator at each end or reversal of the frequency modulation sweep. This is accomplished in Fig. 1. By employing a synchronous motor 64 which drives the cam 33 synchronously with the frequency modulation to close the switch 32 during the periods marked "damped" in Fig. 2.

As previously described the periods during which the tuned circuits are damped are periods during which a discontinuity occurs in the beat-frequency signal. This discontinuity for the case of the sine wave frequency modulation illustrated in Fig. 2 is similar to that illustrated for the case of triangular wave modulation shown in Fig. 7. Also, as previously described, the result of such synchronous damping is that any oscillations present in the tuned circuits 21 to 29 at the time the damping means is made effective are promptly damped out whereby new oscillations may be built up by the next group of beat-frequency cycles (regardless of the beat-frequency phase) without interference due to continuing oscillations previously built up. The effect of this is to increase the apparent selectivity or sharpness of tuning of the tuned circuits 21, 22, etc. as compared with their apparent selectivity when the damping is omitted. In addition to the improved selectivity, the oscillations in the tuned circuits will be built up to maximum amplitude with a minimum number of cycles of a beat-frequency signal.

Fig. 3 shows the invention applied to a system of the type described in the above-mentioned Wolff application Serial No. 452,990. The frequency modulation of the transmitter 10 may be accomplished by means of a sawtooth wave 66, for example, supplied from a sawtooth wave circuit 67 to the frequency modulator 11. The modulator 11 may be some means, such as a reactance tube, for varying the capacity of the tuned circuit of an oscillator included in the transmitter 10. The sawtooth wave circuit 67 has periodically recurring voltage pulses applied thereto from a suitable pulse generator such as a blocking oscillator 68. The circuits for the units 11, 67 and 68 are well known in the art and need not be described in detail. As an example of circuit for units 67 and 68, reference is made to Tolson et al. Patent 2,101,520.

Either the peak amplitude or the frequency (rate of recurrence) of the modulating signal may be varied in synchronism with the movement of the index mark of an indicator 69. In the example illustrated it is the frequency of the modulating wave 66 that is varied. This may be done, for example, by varying the grid leak resistance of the blocking oscillator 68 by means of a motor 71 which drives a rotatable potentiometer arm 72 along a potentiometer resistor 73. The portion of resistor 73 that is between the contact point of arm 72 and one end of the resistor 73 is in parallel with the grid leak resistor 74 whereby the total grid leak resistance is varied to vary the blocking oscillator frequency as the arm 72 rotates.

The arm 76 of the indicator 69 is also rotated by the motor 71 and in synchronism with the rotation of the potentiometer arm 72. The indicator arm 76 has a neon lamp 77 or the like mounted thereon behind a transparent or translucent member carrying scale markings 78. To obtain a sharp index mark, a mask 79 having a slit aperture 81 therein may be mounted on the arm 76 in front of the neon lamp.

The beat-frequency output of the detector 14 is supplied to the indicator lamp 77 through a frequency selective circuit such as the parallel resonant circuit 82 or a tuned amplifier (not shown) and through brushes 83 and 84 and their associated slip rings. As will be described hereinafter, the tuned circuit 82 is damped periodically by means of a damping tube 86.

It will be evident that with the sawtooth circuit 67 supplying sawtooth waves 66 of a particular peak amplitude, the "difference frequency" output of the detector 14 is proportional to the length of the path of the reflected wave times the rate of occurrence of the sawtooth modulating wave. In other words, for a given altitude or other distance, and for a given frequency of the sawtooth wave of a given peak amplitude, the beat-frequency output of the detector 14 has some definite frequency, such as 50,000 cycles per second, for instance. Assuming, by way of example, that the frequency-selective circuit 82 is tuned to pass signal only at 60,000 cycles, it will be apparent that for the example just assumed no signal could pass through the tuned circuit 82 and the neon lamp would not light. However, the neon lamp will light as soon as the rotation of the potentiometer arm 72 changes the rate of recurrence of the sawtooth wave 66 to a value which makes the receiver output have a frequency of 60,000 cycles for the given distance to the reflecting object. Meanwhile, the lamp 77 and the aperture or index mark 81 have been moved along the scale 78 to a point where the correct distance is indicated when a 60,000 cycle receiver output does flash the neon lamp.

Merely by way of example, it may be mentioned that the oscillator 68 may be varied in frequency from 60 to 600 cycles per second by the rotating potentiometer arm 72 while the peak amplitude of the sawtooth wave remains unchanged and of such value that the frequency sweep or frequency deviation of the radiated signal is from a sweep width of 10 megacycles to one of 1 megacycle. The potentiometer arm 72 and the indicator lamp 77 may be rotated several times a second.

In order to obtain the desired periodic damping of the circuit 82, the cathode-anode path of the damping tube 86 is connected across the circuit 82 through conductor 87 and through a conductor 88 and a blocking capacitor 89. The tube 86 may be a vacuum tube of the three element type, for example, which is biased to plate current cut-off. The periodic damping is obtained by applying positive blocking oscillator pulses 91 through a conductor 92 and a coupling capacitor 93 to the grid of the tube 86. The pulses 91 reduce the cathode-anode impedance across the circuit 82 to such low resistance that the circuit is highly damped for a short interval at the end of each frequency-modulation sweep. This is illustrated in Fig. 3a by the graphs 66 and 91, the damping occurring during the intervals indicated by the legend.

Fig. 4 shows the invention applied to a system of the type described and claimed in my copending application Serial No. 496,246, filed July 26, 1943, which has matured into Patent No. 2,426,901, dated September 2, 1947, and entitled Frequency modulated radio locator systems and indicators. The beat-frequency output signal from the detector 14 preferably is amplified by an audio amplifier 17 and supplied to the signal input coil 101 of a multiple-reed frequency indicator 102 that is designed as described in my application just mentioned.

The indicator 102 comprises a plurality of discs A, B, C, D, etc. which are made of steel or other magnetic material. These discs are mounted on a shaft 103, also of magnetic material, which is rotated by a motor 104. The speed of rotation may be 50 rotations per second, for example. Each of the discs A, B, C, etc. has a sine wave configuration cut on its periphery, as illustrated in Fig. 5 where the disc D is shown, there being a different number of sine waves on each disc.

A plurality of tuned reeds A', B', C', etc. are mounted adjacent to the peripheries of the discs A, B, C, etc., respectively, each reed being tuned to the same frequency. For instance they may be tuned to 25 cycles per second and designed to have a comparatively broad frequency response such as a response to frequencies in the range from 10 to 40 cycles or from 0 to 60 cycles. The reeds A', B', C', etc. are mounted on a supporting member 106 which may be bent back on itself to provide a section 106' upon which the input coil 101 is wound. Both the indicator reeds and the member 106 are of magnetic material so that by positioning the end of the section 106' close to the disc A there is provided a closed magnetic circuit for the coil 101. If there is no beat-frequency signal appearing in the detector output circuit, assuming the indicator is being operated with magnetic bias, the only current flowing through the coil will be the D.-C. component of the audio amplifier plate current. In that case, if the discs A, B, C, etc. were stationary there would be a steady magnetic field between the discs and the associated tuned reeds and a steady magnetic pull on the reeds. When the discs are rotated, however, the magnetic force exerted on each reed varies sinusoidally and the rate of this variation at each reed depends upon the number of sine waves cut on the associated disc. Since these pulsations or variations in the magnetic field occur at frequencies that are higher than the frequency response range of the tuned reeds, the reeds are not deflected thereby. Such pulsations will have a range of from 100 to 5000 per second, if, for example, there are 99 discs with two sine waves on the first disc, 3 sine waves on the second disc, etc.

Upon the reception of waves from reflecting objects located at different distances from the transmitter, the resulting beat-frequency signals will flow through the coil 101 and produce at the tuned reeds fluctuations in the magnetic field. These fluctuations will beat with the fluctuations produced by the rotating discs to produce fluctuations in the magnetic field. Since the beat-frequency signals from the detector 14 lie within the range of from 0 to 5000 cycles per second in the example assumed, there will be beat fluctuations in the magnetic force of the required low frequency (0 to 60 cycles) at certain indicator reeds to cause their vibration or deflection. Thus, the deflection of a particular reed indicates the presence of a signal having a particular beat frequency.

In order to avoid any error in the frequency indication due to variations in the speed of the motor 104, it is desirable to maintain synchronism between the motor speed and the frequency-modulating signal. This may be done conveniently by permanently recording the modulating signal, such as a triangular wave, on a magnetic tape 107. The tape 107 may be carried by a non-magnetic wheel that is keyed or otherwise fastened to the shaft 103. The modulating signal is taken off the tape 107 by a pickup unit 108 and supplied to the modulator 11.

In accordance with the present invention I provide means for damping the tuned reeds A', B', etc. during each discontinuity of the beat-frequency output of the detector 14. Fig. 7 shows the time relation of the periodic damping to the frequency modulation sweep represented by the graph 109 and to the beat-frequency detector output represented by the graph 111. It will be noted that the damping is provided during each reversal of the frequency-modulation sweep, this being the time when a discontinuity appears in the beat frequency.

The reeds A', B', etc. may be synchronously damped in various ways, one of which is shown in Figs. 4 and 5. Here the indicator is provided with a pair of damping bars 112 and 113 movably mounted on opposite sides of the tuned reeds A', B', etc. whereby they may be moved into contact with the reeds periodically.

Tension springs 116 and 117 may be provided to pull the damping bars 112 and 113 away from the tuned reeds at the end of each damping period, the two damping bars being coupled at each end by suitable linkage means 118 and 119 to cause the bar 113 to move toward the tuned reeds whenever the bar 112 is moved toward the reeds. The damping bars 112 and 113 are moved against the tuned reeds periodically and held there for the "damped" period indicated in Fig. 7 by means of cams 121 and 122 which are fastened on a shaft 123 and which engage the bar 112. Each cam has two diametrically raised portions, as shown for the cam 121 in Fig. 5, whereby the damping bars 112 and 113 are brought against the reeds A', B', etc. twice for each rotation of the shaft 103, this also being twice per frequency modulation sweep in the example assumed where the frequency modulating wave is triangular. The cams 121 and 122 may be driven by the shaft 103 through gears 124 and 126. The sides of the damping bars 112 and 113 that face the tuned reeds may be covered with felt, rubber or some other suitable damping material.

Fig. 6 illustrates another way of damping the tuned reeds. Each of the discs A, B, C, D, etc. has damping blocks 127 and 128 of rubber or other suitable damping material attached to diametrically opposed points on its periphery so that they come into contact with the reeds periodically. On the opposite side of each tuned reed, similar damping blocks 129 and 131 may be mounted on the periphery of a disc 132 which is rotated by means of gears 133 and 134. Thus the tuned reeds are clamped periodically between the upper and lower damping blocks so that the reed vibrations always build up from zero amplitude immediately following each discontinuity of the beat frequency.

I claim as my invention:

1. A radio locator system comprising means for cyclically frequency modulating a radio wave and for transmitting it to a reflecting object, a detector, means for applying to said detector both the reflected wave and the wave direct from the transmitter to produce a beat-frequency signal which may have a discontinuity at the end of each frequency-modulation sweep, a frequency indicator comprising a tuned element, and means for damping said tuned element at least once during each frequency-modulation cycle with the damping occurring simultaneously with a discontinuity in the beat-frequency signal.

2. A radio locator system comprising means for cyclically frequency modulating a radio wave and for transmitting it to a reflecting object, a detector, means for applying to said detector both the reflected wave and the wave direct from the transmitter to produce a beat-frequency signal which may have a discontinuity at the end of each frequency-modulation sweep, a frequency indicator comprising a tuned element, and means for damping said tuned element at the end of each frequency-modulation sweep.

3. A radio locator system comprising means for cyclically frequency modulating a radio wave and for transmitting it to a reflecting object, a detector, means for applying to said detector both the reflected wave and the wave direct from the transmitter to produce a beat-frequency signal which may have a discontinuity at the end of each frequency-modulation sweep, a frequency indicator comprising a resonant circuit, and means for damping said resonant circuit at the end of each frequency-modulation sweep.

4. A radio locator system comprising means for cyclically frequency modulating a radio wave and for transmitting it to a reflecting object, a detector, means for applying to said detector both the reflected wave and the wave direct from the transmitter to produce a beat-frequency signal which may have a discontinuity at the end of each frequency-modulation sweep, a frequency indicator connected to receive said signal and comprising a plurality of resonant circuits, and means for damping said resonant circuits at the end of each frequency-modulation sweep and during each of said discontinuities.

5. A radio locator system comprising means for cyclically frequency modulating a radio wave and for transmitting it to a reflecting object, a detector, means for applying to said detector both the reflected wave and the wave direct from the transmitter to produce a beat-frequency signal, a frequency indicator comprising a plurality of similarly tuned indicator elements, means for applying to said tuned elements an electrical force that varies in accordance with said beat-frequency signal, means for varying said electrical force at a different periodic rate at each of said tuned elements and in synchronism with said cyclic frequency modulation for producing beats in said force whereby a given frequency component in the applied signal produces beats differing in frequency at the different tuned elements, one of said beats having a frequency within the response range of said tuned elements whereby it actuates the tuned element that is located where said one beat occurs, and means for damping said tuned elements at the end of each frequency-modulation sweep.

6. A radio locator system comprising means for cyclically frequency modulating a radio wave and for transmitting it to a reflecting object, a detector, means for applying to said detector both the reflected wave and the wave direct from the transmitter to produce a beat-frequency signal, a frequency indicator comprising a plurality of similarly tuned indicator elements, means for applying to said tuned elements an electrical force that varies in accordance with said beat-frequency signal, means for varying said electrical force at a different periodic rate at each of said tuned elements for producing beats in said force whereby a given frequency component in the applied signal produces beats differing in frequency at the different tuned elements, one of said beats having a frequency within the response range of said tuned elements whereby it actuates the tuned element that is located where said one beat occurs, said means for frequency modulating the radio wave comprising a record of the frequency-modulating wave, means for taking signal off said record synchronously with the production of said periodic rate variations, and means for damping said tuned elements at the end of each frequency-modulation sweep.

7. A radio locator system comprising means for cyclically frequency modulating a radio wave and for transmitting it to a reflecting object, a detector, means for applying to said detector both the reflected wave and the wave direct from the transmitter to produce a beat-frequency signal, a frequency indicator comprising a plurality of similarly tuned indicator reeds, means for applying to said tuned reeds an electrical force that varies in accordance with said beat-frequency signal, means for varying said electrical force at a different periodic rate at each of said tuned reeds and in synchronism with said cyclic frequency modulation for producing beats in said force whereby a given frequency component in the applied signal produces beats differing in frequency at the different tuned reeds, one of said beats having a frequency within the response range of said tuned reeds whereby it actuates the tuned reed that is located where said one beat occurs, and means for damping said reeds at the end of each frequency-modulation sweep.

ROYDEN C. SANDERS, Jr.

REFERENCES CITED

The following references are of record in the file of this patent:

UNITED STATES PATENTS

| Number | Name | Date |
| --- | --- | --- |
| 2,045,072 | Espenschied | June 23, 1936 |
| 2,236,893 | Chaffee | Apr. 1, 1941 |
| 2,256,539 | Alford | Sept. 23, 1941 |